Figure 1:
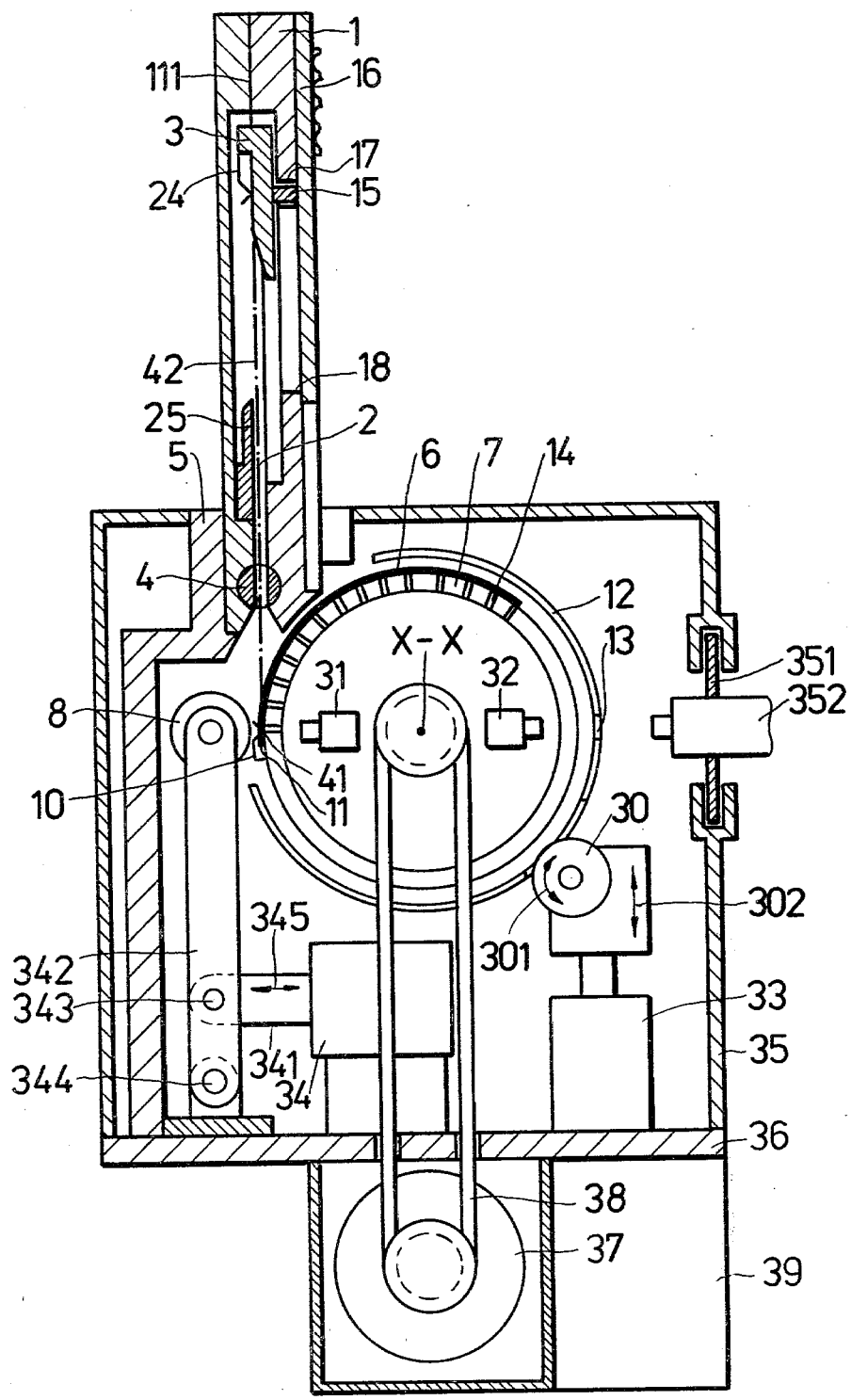

United States Patent [19]

Deter et al.

[11] 4,353,538

[45] Oct. 12, 1982

[54] INPUT-OUTPUT DEVICE FOR PHOTOGRAPHIC FILM MATERIALS

[76] Inventors: Christhard Deter, 27, Brehmstrasse; Wolfgang Schaller, 7/5 Lobensteiner Str., both of Gera; Rudolf Schönfeld, 10, Goethestrasse, Münchenbernsdorf, District of Gera; Klaus Haak, 24, Am Stadion, Hermsdorf, District of Gera, all of German Democratic Rep.

[21] Appl. No.: 231,723

[22] Filed: Feb. 5, 1981
(Under 37 CFR 1.47)

[30] Foreign Application Priority Data

Feb. 1, 1980 [DD] German Democratic Rep. ... 218794

[51] Int. Cl.³ .............................................. B65H 5/22
[52] U.S. Cl. ......................................... 271/3; 271/42; 271/82; 271/194; 378/182
[58] Field of Search ....................... 271/3, 42, 194, 82; 250/468, 470, 471

[56] References Cited

U.S. PATENT DOCUMENTS

| | | | |
|---|---|---|---|
| 3,784,834 | 1/1974 | Berger | 250/268 |
| 4,157,178 | 6/1979 | Ollendick | 271/3 |
| 4,260,896 | 4/1981 | Schmidt | 250/268 |

Primary Examiner—Richard A. Schacher

[57] ABSTRACT

The invention relates to an input/output device for unexposed or latently exposed photographic sheet material for use in combination with photographic material evaluation devices. The invention comprises a flat light-tight cartridge having an opening, a film support displaceably arranged within said cartridge and externally operable, and a light-stop for said opening. The cartridge is insertable into a socket of the evaluation device so that the film can be shifted out of the cartridge and into the likewise light-tight evaluation device to be secured to holding means of a recording drum in said device. By sucking means within and respective rotation of said drum the film is evenly attached to the drum surface. By control of the input/output operation by means of a control unit an automatic handling of film material at normal light conditions is feasible.

4 Claims, 4 Drawing Figures

INPUT-OUTPUT DEVICE FOR PHOTOGRAPHIC FILM MATERIALS

The invention relates to an input/output device for photographic film material particularly for use in combination with map plotting devices, where the photographic films, exposed or unexposed are continuously subject to transportation. Moreover, the device can be employed in all cases where light sensitive sheet material has to be inserted into, and after exposure, has to be removed from an evaluation device.

There are rotating exposure drums known where the light sensitive film material cartridge comprises a recording drum, the seating for said drum, and a light-tight casing enclosing the aforesaid components.

The entire unit is detachable. The recording drum is dismantled in the darkroom and the light-sensitive film material is tensioned to the drum or the exposed film is taken off the drum. This device is disadvantageous since a continuous operation thereof requires a plurality of cylindrical cartridges, the transport of which is complicated apart from the difficulty to store cylindrical cartridges. It is an object of the invention to obviate the above disadvantages.

It is a further object of the present invention to provide a simple and serviceable photographic film input-/output device which permits to feed the unexposed film material into an evaluation device and to remove the exposed film material from said device, both operations being performed at normal light.

These and other objects are realised in an input/output device for photographic film materials in combination with an evaluation device or the like comprising a cartridge for the photosensitive material and a cartridge mount provided at the evaluation device. The cartridge consists of at least a light-tight casing, which has an opening for the film input/output, a displaceable externally operable film support within the cartridge being located opposite to the opening in the cartridge casing, and a mechanical light stop for closing the cartridge opening.

The cartridge is inserted via the cartridge opening portion into a respective mount of an evaluation device. The film in said cartridge is arranged in a plane in tangent relation to a recording drum of the evaluation device. At least one pressure wheel is located adjacent the contacting point of the tangent plane with the recording drum.

Securing members are provided along the drum surface for securing the film material to the recording drum. Guiding means are located around the drum surface. Suction holes in the drum surface being covered by an inserted film serve to attract the film to the recording drum.

A positioning unit controls the position of the recording drum relative to a film to be evaluated and further serves to coordinate the operational run and the suction operation in the course of an automatic film input/output.

The positioning unit comprises a drive means and a first and a second nominal-to-actual position comparator. The first nominal-to-actual position comparator positions the recording drum relative to the film input in such a manner that the securing means for holding the film lie in a contacting line of the tangent plane with the recording drum.

The second nominal-to-actual position comparator positions the recording drum for the film output in such a manner that the free end of the film lies between the pressure roller and the recording drum in the tangent plane after the air suction device is switched off.

Advantageously, the recording drum is surrounded by a tube provided with longitudinal slots to permit passage of the operation means of the film evaluation device.

The film support in the cartridge is connected via a connection element to an external operation member so that the film support can be moved into a first end position remote from the cartridge opening and into a second end position adjacent the cartridge opening.

Alternatively, the cartridge can consist of two components displaceably one into the other, which by a telescope-like combination form a cabinet for receiving the photographic films.

The upper component in its interior is provided with clamping means for arresting the film material.

The arresting means is in a release position when the two components are contracted, and in the arrest position when the two components are extended.

In the lower component the cartridge opening is provided with a mechanical light stop constituted of a longitudinally slotted cylinder rotatable in the cartridge aperture. The light stop is provided with an arrest means for the film support movements which are blocked when the cartridge opening is closed. The invention device permits a considerable reduction of the time required for the film exchange, thus the dead times of the evaluation device and the computer connected thereto are reduced, apart from simplifying the transportation of the unexposed film material.

Furthermore a plurality of films in cartridges can be held in stand-by position at normal light conditions, and can be fed into the film evaluation device as required.

The time consuming mounting and dismounting of the recording drum and the respectively required adjustments of the drum are also eliminated.

Figure 3:
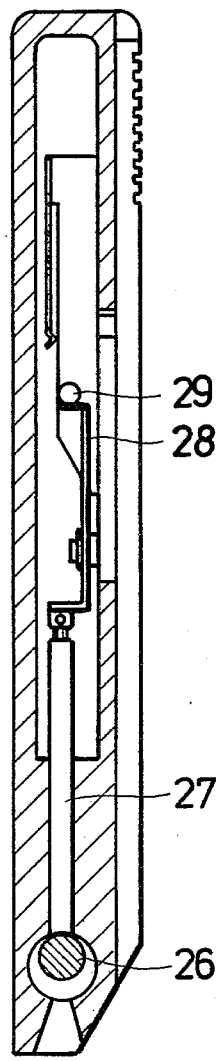
Figure 4:
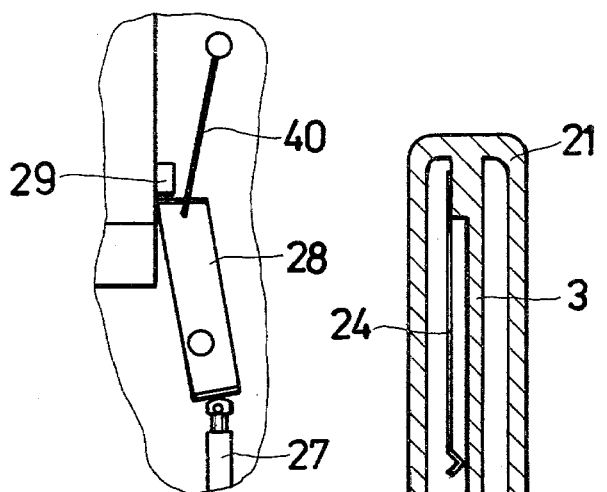
Figure 2:
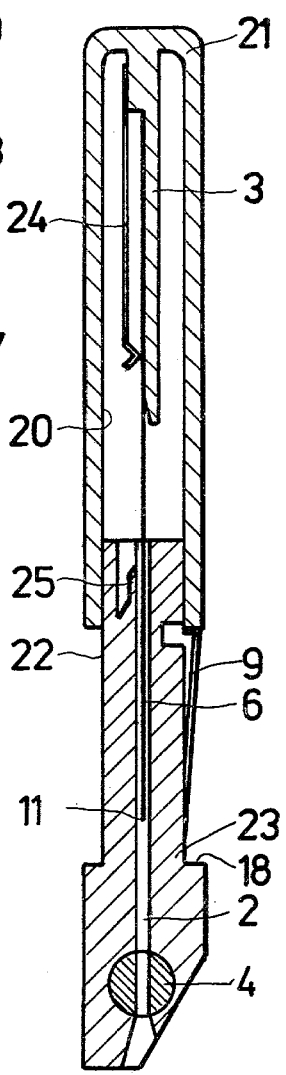

In order that the invention may be more readily understood reference is made to the accompanying drawings which illustrate diagrammatically and by way of example two embodiments thereof, where FIG. 1 is a schematic view of an input/output device for photographic film material, FIG. 2 is a schematic view of a film cartridge constituted of two components, FIG. 3 is a schematic view of a film cartridge with the film support being externally operable, and FIG. 4 is a part of FIG. 3 showing a blocking means for the film support with the cartridge closed.

In FIG. 1 a cartridge 1 has a light-tight casing 111 and a cartridge opening 2 which can be closed by a light-stop 4.

The film support 3 which via a member 15 is connected to an externally provided operation member 16 is displaceable within said cartridge up to two end positions, the first being defined by a stop member 17, remote from said opening 2, and a second being defined by a stop member 18 in the vicinity of said opening 2. A nose 25 projects into the interior of the cartridge 1 in parallel to and adjacent a plane 42 which is the plane of a film 6 (shown in another position) in the cartridge 1.

The cartridge 1 is plugged into a socket portion 5 of a film evaluation device housing 35 with the opening 2 facing a recording drum 7 of said evaluation device in such a manner that the plane 42 is the tangent to said drum 7 which is rotatable about an axis X—X at right angles to the drawing plane.

In the present embodiment the plane 42 contacts the recording drum 7 along a line 41, which is perpendicular to the drawing plane.

In the vicinity of the contacting line 41 and in opposition to the recording drum 7 at least one pressure roll 8 is installed for pressing the film 6 to the recording drum 7 surface. Resilient clamping means 10 are provided upon the surface of the recording drum 7 for to clamp one end portion 11 of the film 6.

Thus the latter is held in a definite position upon the drum 7. Furthermore, the recording drum 7 is partially enveloped by a guiding means, namely a part of a tube 12, which is provided with slots 13 to permit passage of operational components.

Suction holes 14 are provided in that portion of the recording drum 7 surface which is covered by the film 6 for sucking the latter tightly to the surface of the drum 7 via a not shown exhausting system.

The distance between the end position stops 17 and 18 is matched to the length of the film sheet and to the distance of the film 6 in the cartridge 1 to the clamping means 10.

A control unit 39 of the evaluation device comprises a driving means 30, a first nominal-to-actual position comparator 31 for positioning the recording drum 7 to enable insertion of a film into the clamping means 10 of the drum 7, and a second nominal-to-actual position comparator 32 for positioning the drum 7 to put out the evaluated film 6.

The recording drum 7 is connected via a transmission belt 38 to a servo-motor 37.

A first lifting magnet 34 is connected via respective arms 341, 342 and pivots 343, 344 to the pressure roll 8 for displacing the latter in the directions indicated by a double arrow 345.

The operation of the lifting magnet 34 is controlled by the control unit 39. A second lifting magnet 33 is connected via a drive means 30 of the control unit 39. Housings 36 and 35 form a light-tight pan for the recording drum 7.

In the housing 35 an optical system 352 is displaceably arranged relative to the drawing plane and seated in light-tight guides 351.

Said optical system 352 permits exposure of the film 6 through the slots 13, with the drum 7 accordingly positioned.

In FIG. 2 the cartridge 1 for the film 6 is composed of two components 21 and 23 which are telescope-like displaced relative to each other about a definite path length.

The interior face 20 of the component 21 is slidingly arranged relative to the outer surface 22 of the component 23.

The component 21 has the film support 3 and a clamping means 24 in parallel to the former and to a film 11 for clamping the latter to the support 3. The interior component 23 comprises a nose 25, a stop 18 for one end position of the film support 3, a spring 9 and the cartridge opening 2 with a light-stop 4.

The latter is constituted of a cylinder having a longitudinal slot and being rotatable in respective portions of the cartridge opening 2.

In FIGS. 3 and 4 a blocking unit for the film support 3 with the film cartridge closed comprises an eccentric 26, a rod 27, a double angle lever 28 abutting via one lever portion to the rod 27 and via the other lever portion to a pin 29 of the film support 3, and a return spring 40.

In operation, an unexposed film is inserted into the cartridge 1 in a dark-room by pushing the operation means 16 of the film support 3 to the end position adjacent the opening 2, thereby the connecting member 15 leaves the stop 17 to be arrested at the stop 18 (FIG. 1), and the exterior component 21 is arrested at the stop 18, respectively, (FIG. 2). Nearly in said end position the clamping means 24 slides upon the nose 25 and thus permits the insertion of the unexposed film.

By pushing the operation means 16 in opposite direction off the opening 2, the clamping means 24 leaves the nose 25 and presses the film 6 against the support 3 so that the film 6 can entirely be drawn into the interior of the cartridge 1.

The pushing movement comes to a standstill at the stop 17 or unitl the spring 9 is arrested (FIG. 2). The non-clamped end portion of the film is now positioned behind the light-stop 4 and the cartridge is closed by rotating the light-stop so that the slot therein is at right angles to the film plane 42. Simultaneously, the film support is arrested by said rotating operation via the rod 27 and the lever 28. The cartridge is plugged into the socket 5 of the evaluation device and opened through a start order from the control member 39.

The drive 30 is lifted by the lifting magnet 33 to the drum 7 surface and the drum 7 is rotated into the film input position (as shown in FIG. 1) which is signalised by the nominal-to-actual-position comparator 31.

In this position the rotation of the drum 7 is stopped. The operator handles the cartridge 1 as described hereinabove so that when the member 15 is arrested at the stop 18 the unexposed film material is fixed to the clamping means 10, after end portion of the film nearest to the drum 7 has passed the slot of the light stop 4.

Thus the end portion of the film 6 is held to the recording drum 7.

At the same time the pressure roll 8 is pressed upon the film 6 by operation of the lifting magnet 34. By control of the control unit 39 the drum 7 is so rotated that the film 6 is attached to the surface of the drum.

Via the control unit 39, the suction device is operated so that when all suction holes 14 are covered by the film 6 the latter is evenly attracted to the surface of the drum 7.

Then the drive 30 is removed from the drum surface by opposite operation of the lifting magnet 33. The recording or exposure starts after the correct rotational speed is imparted to the recording drum 7 via the servo-motor 37 and the transmission belt 38. After finalising the recording operation the drum 7 is stopped and the drive 30 lifted to the drum 7 surface by the lifting magnet 33.

Under control of the second nominal-to-actual-position comparator 32 the drum 7 is rotated into the film output position.

After switching off the suction device the film is detached from the drum 7 surface and the free end of the film 6 lies in the plane 42 opposite to the cartridge opening 2.

The drive 30 rotates the recording drum 2 so that the film end portion funnels through the cartridge opening 2 into the open clamping means 24.

The clamping means 10 releases the other film end portion and the pressure roll 8 takes off the drum 7. The operator entirely draws the exposed film into the cartridge either by pushing the operating means 16 up to the stop 17 (FIG. 1) or by telescopic extension of the components 21 and 23.

A control signal of the control member 39 closes the cartridge light stop 4 and the cartridge 1 is detached from the evaluation device socket 5. It is to be understood herein that the film material in the above description is a sheet material the length of which is shorter than the circumference of the drum 7. The roll 8 can be moved in guides provided in the housing 35, instead of the tiltable lever 342.

The clamping means 24 can be embodied by a clamping spring or a resilient bar or any other suitable means.

We claim:

1. An input/output device for photographic film material, comprising
a cartridge,
a film material being a photographic sensitive sheet,
a film support being displaceably arranged in the interior of said cartridge between two end positions,
an operation member externally arranged on said cartridge and being connected to said film support,
a clamping means being provided on said film support for clamping said film material to said film support,
a slot shaped opening being provided in said cartridge for film input/output,
a light-stop for closing said slot-shaped opening,
a release means in said cartridge in the vicinity of said light stop,
said release means being for at least partially releasing said clamping means,
a light-tight housing,
an opening being provided in said housing,
said opening being for receiving said portion of said cartridge being provided with said slot-shaped opening,
a drum being rotatably seated in said housing,
an extension-line of said slot-shaped opening being the tangent to said drum,
an arrest and clamping means being connected to said drum for a defined holding of one end portion of said film to said drum,
a roll for pressing said film to said drum,
said roll being displaceable at right angles to the surface of said drum,
a first means for holding said film to and releasing said film from said drum, and
a second means for definedly rotating said drum in said housing.

2. Arrangement as claimed in claim 1, wherein the cartridge is constituted of two components the one being telescope-like and displaceably arranged in and relative to the other one, the one component including said film support being the displaceable member, the other component containing the slot-like opening, the release means and the light-stop.

3. Arrangement as claimed in claim 1, wherein the light-stop is constituted of a longitudinally slotted cylinder rotatable about the cylinder axis, and wherein the slot is of the same width as said slot-like opening in said cartridge.

4. Arrangement as claimed in claim 3, wherein an eccentric is rotatably seated in the vicinity of said light-stop about said cylinder axis, said eccentric operating, against the force of a spring, a member of said film support via a rod and a double lever.

* * * * *